A. G. & J. R. CUMMINS.
Gang-Plows.

No. 146,807.  Patented Jan. 27, 1874.

Witnesses:

Inventor:
A. G. Cummins
J. R. Cummins
Per ———— Attorneys.

AM. PHOTO-LITHOGRAPHIC Co. N.Y. (OSBORNE'S PROCESS)

UNITED STATES PATENT OFFICE.

ALLISON G. CUMMINS AND JOHN R. CUMMINS, OF McKINNEY, TEXAS.

IMPROVEMENT IN GANG-PLOWS.

Specification forming part of Letters Patent No. 146,807, dated January 27, 1874; application filed May 24, 1873.

*To all whom it may concern:*

Figure 1:
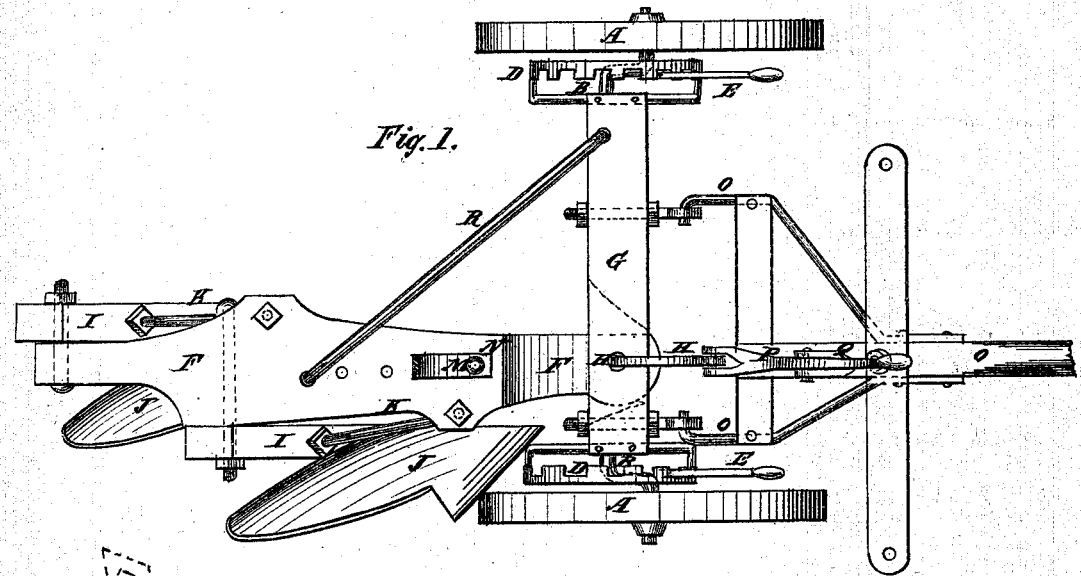
Figure 2:
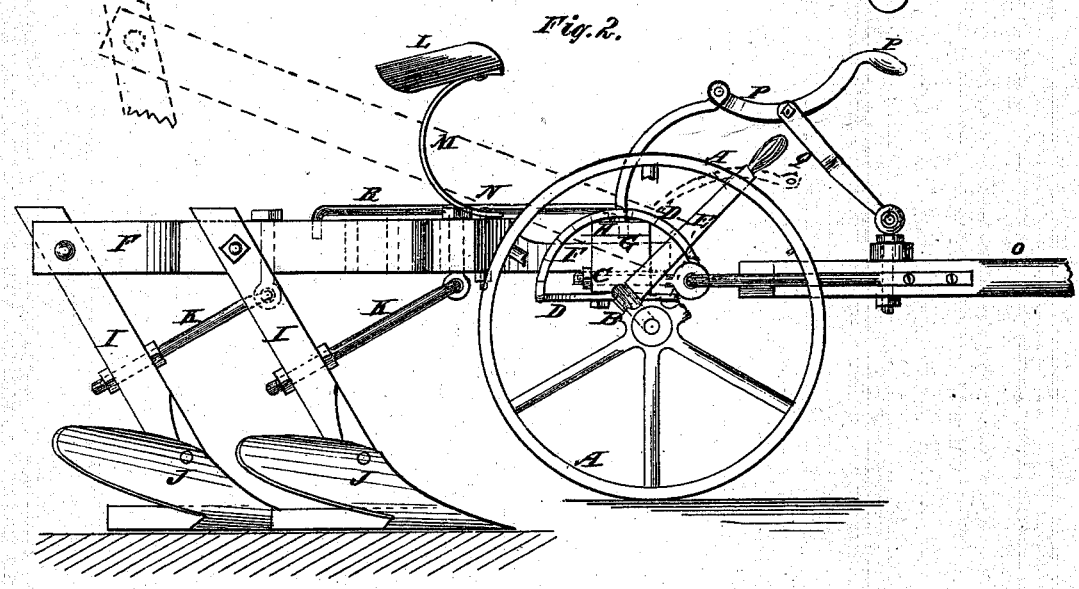
Figure 3:
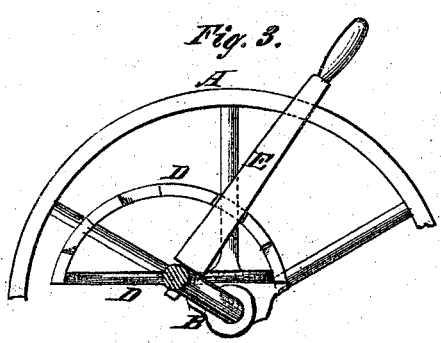

Be it known that we, ALLISON G. CUMMINS and JOHN R. CUMMINS, of McKinney, in the county of Collins and State of Texas, have invented a new and useful Improvement in Gang-Plow, of which the following is a specification:

Figure 1 is a top view of our improved gang-plow. Fig. 2 is a side view of the same. Fig. 3 is a detail view of the crank-axle and device for adjusting it.

Similar letters of reference indicate corresponding parts.

The invention will first be fully described, and then clearly pointed out in the claim.

A are the wheels, which are made of the same size, and which may be ordinary wagon-wheels. The wheels A revolve upon the journals of the crank-axles B, the inner parts of which work in bearings in the under side of the ends of the axle C, where they are secured in place by a bar attached to said axle C, and which fits into ring-grooves in the inner arms of said axles B. The inner parts of the crank-axles B are further secured in place by the lower or straight side of the semicircular catch-bar D, which is bolted to the lower side of said axle C, and the curved part of which is made with an offset, so that, while rising above the axle C, it may leave space between it and the end of the said axle C for the passage of the lever E, the lower end of which is attached to the crank-axles B, so that the said axles B may be adjusted to raise and lower the wheels A by moving the levers E in one or the other direction. The levers E are held in any position into which they may be adjusted by springing into notches in the curved parts of the semicircular bars D. F is the plow-beam, the forward end of which enters a recess between the axle C and bolster G, where it is pivoted by the king-bolt H, which passes down through the said bolster, beam, and axle. To the opposite sides of the beam F are attached the upper ends of the standards I, at suitable distances in front of each other, the beam F being so formed as to bring the said standards to a suitable distance apart laterally. To the lower ends of the standards I are attached the plows J. The draft strain upon the standards I is sustained by the brace-rods K, the lower ends of which are secured adjustably to the said standards, and their upper ends are secured to the said beam F. When only one plow is to be used, the standards I are both detached, and the right-hand plow-standard is moved back, and is attached to the right-hand side of the rear end of the plow-beam F. L is the driver's seat, which is secured to the upper end of a curved spring-standard, M, the lower end of which is secured to the beam F by a bolt, N. Several holes are formed in the beam F to receive the bolt N, so that by shifting the bolt N the weight of the driver may be brought more or less directly over the plows, as the character of the plowing may require. O is the tongue, which is hinged to the axle C by eyebolts, or other convenient couplings. The king-bolt H is extended upward, and curved forward, and to its upper end is pivoted the lever P, to which, at a little distance from its pivoted end, is pivoted the end of a connecting-rod, Q, the other end of which is pivoted to the tongue O.

By this construction, by moving the free end of the lever P to the rearward, so as to lie along the curved upper part of the king-bolt H, the plows will be raised and locked away from the ground. When breaking up, or when bedding or ridging cotton or other land, or when doing other plowing that requires a rigid plow-beam, the brace R is used, the forward end of which is hooked into or otherwise connected with the forward bolster or axle, and its rear end is hooked into or otherwise connected with the beam F.

Having thus described our invention, we claim as new and desire to secure by Letters Patent—

The combination, with the hinged plow-beam or frame F and the tongue O, of the king-bolt H extended upward, as shown, the lever P hinged thereto, and the connecting-link Q, all as shown and described, whereby the said lever can be swung over onto the king-bolt and the parts locked, as and for the purpose specified.

ALLISON G. CUMMINS.
JOHN R. CUMMINS.

Witnesses:
S. K. RUDOLPH,
J. L. FAIRES.